US012595373B2

(12) United States Patent
Bendzko et al.

(10) Patent No.: US 12,595,373 B2
(45) Date of Patent: Apr. 7, 2026

(54) TITANIUM DIOXIDE PIGMENT WITH COLORING AFTER-TREATMENT

(71) Applicant: Kronos International, Inc., Leverkusen (DE)

(72) Inventors: Norbert Bendzko, Leverkusen (DE); Frank Mersch, Leverkusen (DE)

(73) Assignee: KRONOS International, Inc., Leverkusen (DE)

( * ) Notice: Subject to any disclaimer, the term of this patent is extended or adjusted under 35 U.S.C. 154(b) by 445 days.

(21) Appl. No.: 18/106,322

(22) Filed: Feb. 6, 2023

(65) Prior Publication Data

US 2023/0250295 A1 Aug. 10, 2023

(51) Int. Cl.
*C09C 3/06* (2006.01)
*C01G 23/047* (2006.01)

(52) U.S. Cl.
CPC ............ *C09C 3/063* (2013.01); *C01G 23/047* (2013.01); *C09C 2200/1004* (2013.01)

(58) Field of Classification Search
CPC .............. C09C 1/00; C09C 3/063; C09D 5/36
See application file for complete search history.

(56) References Cited

U.S. PATENT DOCUMENTS

| | | | |
|---|---|---|---|
| 2,219,129 A | 10/1940 | Geddes | |
| 2005/0147724 A1* | 7/2005 | Schweinfurth ...... | A61K 9/2813 |
| | | | 426/540 |
| 2014/0322534 A1* | 10/2014 | Suzuki ..................... | C09D 7/62 |
| | | | 423/625 |

FOREIGN PATENT DOCUMENTS

| | | | | |
|---|---|---|---|---|
| DE | 4137764 | * | 5/1993 | .............. A61K 8/11 |
| DE | 4137764 A1 | | 5/1993 | |
| EP | 0401045 A1 | | 12/1990 | |
| EP | 3269779 A1 | * | 1/2018 | ........... A61K 8/0258 |
| WO | 2017091675 A1 | | 6/2017 | |

OTHER PUBLICATIONS

Extended European Search Report, issued in corresponding European Patent application No. 22155774.7, dated Aug. 11, 2022.

* cited by examiner

*Primary Examiner* — Pegah Parvini
(74) *Attorney, Agent, or Firm* — Robert Lelkes; LELKES IP

(57) ABSTRACT

The invention relates to a colored pigment particle, a method for obtaining said colored pigment particle, and a composition comprised of said particle. In addition, the invention refers to the use of said colored pigment particle.

20 Claims, 1 Drawing Sheet

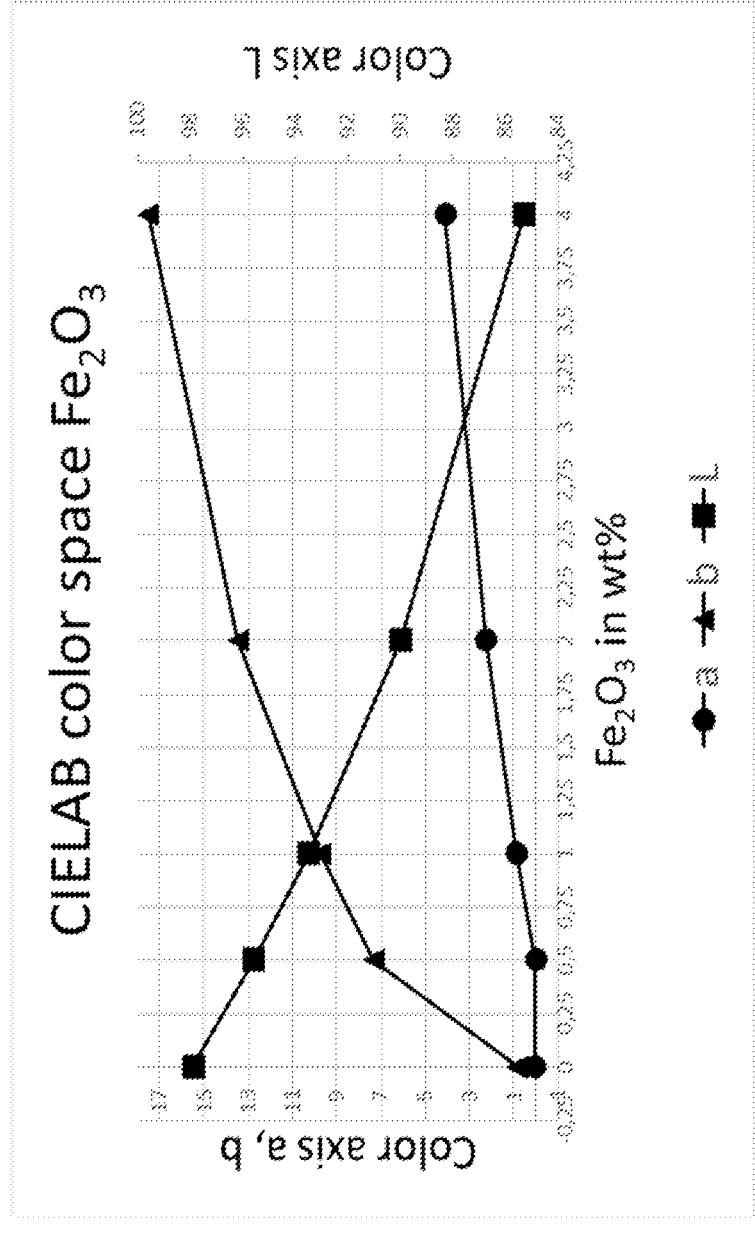

TITANIUM DIOXIDE PIGMENT WITH COLORING AFTER-TREATMENT

RELATED APPLICATION

This application claims the benefit of European Patent Application No. 22 155 774.7, filed on Feb. 9, 2022.

BACKGROUND

Field of the Invention

The invention relates to a colored pigment particle, a method for obtaining said colored pigment particle, and a composition comprised of said particle. Finally, the invention refers to the use of the colored pigment particle in various applications.

Technological Background of the Invention

Besides the use of titanium dioxide as a white pigment in high-end applications, titanium dioxide is also used in colorful applications. In the later application, it scatters visible light thereby providing the desired hiding power which cannot be provided by the coloring pigment.

Depending on the end use of the colored titanium dioxide pigment particle, it is commonly provided by the two following forms: either, a ground coating with titanium dioxide is applied and a further coating comprised of a coloring component is applied on the ground coating. This approach is, for example, used in high-end uses such as automotive coatings. Alternatively, the titanium dioxide is mixed with the coloring component, and the obtained mixture is applied as a single coating.

Both approaches, however, have several drawbacks. The agglomerated coloring components will necessarily decay, as the size of the agglomerates is too high. In addition, the coloring component is reamed with the result that said component is ideally dispersed in the composition. By the nature of the vast majority of these components, this requires a high application of energy and is moreover time-consuming.

Further, when a single coating with a mixture of titanium dioxide and the coloring component is applied, the coloring components located far away from the coatings' surface might be covered by titanium dioxide particles and thus, provide no coloring effect. As a consequence, a higher amount of the coloring pigment particle must be incorporated in order to achieve the desired coloring effect which entails higher costs.

Thus, there is a need in the art for a colored pigment particle which is easy to manufacture and handle, effectively provides an coloring effect and is moreover cost-effective. It is also desired to provide a colored particle in which a broad range of colors can be employed. Thus, various coloring components should be applicable.

SUMMARY OF THE INVENTION

It is the object of the invention to provide a colored pigment particle which is easy to be manufactured and handled, effectively provides a coloring effect and is moreover cost-effective. Also, it is also desired to provide a colored particle in which a broad range of colors can be employed. Thus, various coloring components should be applicable.

This object is achieved by the colored pigment particle, the method to obtain the same, a composition which comprises said particle as well as the use of the herein described pigment particle.

It has been surprisingly found that a colored pigment particle comprised of a titanium dioxide based pigment and at least one layer which is characterized in that the at least one layer is modified with a coloring component is easy to be manufactured and handled, effectively provides an coloring effect and is moreover cost-effective. As many coloring components can be applied, the colored pigment particle according to the invention is not limited to a particular color, but many different colors can be provided. Due to the modification of the at least one layer with a coloring component, there is no need to incorporate the coloring component in an additional step into the composition such as a lacquer, paint or the like which is very burdensome as a lot of time and energy is required for this step. Notably, incorporating the pigment particle according to the invention is less burdensome. In addition, the amount of expensive coloring components can be reduced as the component is used more efficiently.

Therefore, in a first aspect, the invention relates to a colored pigment particle comprised of a titanium dioxide based pigment and at least one layer, characterized in, that the at least one layer is modified with a coloring component.

In a second aspect, the invention is directed to a method for obtaining a colored pigment particle comprised of the following steps:

a) providing an aqueous suspension of a titanium dioxide based pigment, b) adding a layer precursor to said suspension, c) adding a coloring component to said suspension, and d) forming a layer from the layer precursor modified with the coloring component onto the titanium dioxide based pigment to obtain the colored pigment particle.

In a further aspect, the invention is directed to a composition comprised of the colored pigment particle as claimed herein.

In another aspect of the invention, the invention pertains to a composition comprised of a colored pigment particle as claimed herein.

Finally, the invention refers to a use of the colored pigment particle as claimed described herein to color a layer, lacquer, paint, plastic, paper or ink.

Further advantageous embodiments of the invention are stated in the dependent claims.

BRIEF DESCRIPTION OF THE FIGURES

For a more complete understanding of the present invention and for further advantages thereof, reference is now made to the following description taken in conjunction with the accompanying drawings in which:

FIG. 1 is a graph of the CIELAB results of Examples 1a-1d.

DESCRIPTION OF THE INVENTION

These and other aspects, features and advantages of the invention become obvious to the skilled person from the study of the following detailed description and claims. Each feature from one aspect of the invention can be employed in any other aspect of the invention. Numerical ranges stated in the format "from x to y" include the mentioned values and the values that are within the respective measuring accuracy as known to the skilled person. If several preferred numerical ranges are stated in this format, it is a matter of course that all ranges formed by the combination of the various end points are also included. The use of the term "about" is intended to encompass all values that lie within the range of the respective measurement accuracy known to the skilled person.

All percentages stated in connection with the compositions herein described relate to percent by weight (wt.-%) unless explicitly stated otherwise, respectively based on the mixture of composition in question. The term "substantially free" is intended to connote that the particular material is not detected (i.e. is below the detection limit) using standard commercial tests and methodologies used in the industry as of the earliest priority date of this application or otherwise is only detected in trace amounts such as might be caused by contaminants in the particular grade of materials used or arising from the manufacturing process. Unless otherwise stated, standard commercial grades of materials are used and it is preferred that the various materials are substantially free of other compounds.

The colored pigment particle according to the present invention is comprised of a titanium dioxide based pigment and at least one layer, characterized in that the at least one layer is modified with a coloring component. "Titanium dioxide based pigments", as used herein, refers to titanium dioxide based pigments obtained by the sulphate or chloride process which are optionally milled. Further, said based pigment may be present in the crystal structures of rutile, anatase or brookite, usually in the crystal structures of rutile or anatase. Rutile is particularly suitable as compared to anatase because of its lower photocatalytic activity. Preferably, said titanium dioxide based pigment consists of at least 98 wt. %, preferably of at least 99 wt. % rutile referred to the total weight of said particles. Said particle further comprises at least one layer. Precursors and techniques to form such at least one layer are known in the art. The at least one layer is modified with a coloring component. Any coloring component known in the art can be used which confers color, preferably a color different than white or black.

Within the scope of the invention, the titanium dioxide based pigment has a primary particle size such that it scatters the visible light is scatter, ideally to a high rate. The particle size is the mass-related median d50 (hereinafter: d50) of from 200 nm to 400 nm determined by disc centrifuge. "Primary particle", as used herein, relates to a particle which may form together with at least one other particle to form agglomerates and aggregates. This definition of primary particles also covers twins and multiple twins, which are known in the art and can be analyzed by, for example, TEM analysis.

In a preferred embodiment, the pigment particle comprises a further layer.

In yet another preferred embodiment, the at least one layer is located between the titanium dioxide based pigment and the further layer. In an alternative preferred embodiment, the further layer is located between the titanium dioxide based pigment and the at least one layer.

The at least one layer and the further layer are preferably independently selected from the group consisting of silicon dioxide, aluminum oxide, zirconium dioxide, manganese oxide, cerium oxide, titanium dioxide, sulfate or phosphate based inorganic compounds or a mixture thereof. The phosphate based inorganic compound is preferably aluminum phosphate. The sulfate based inorganic compound is preferably cerium sulfate. Even more preferably, the at least one layer and the further layer are independently selected from the group consisting of silicon dioxide, aluminum oxide, zirconium dioxide, manganese oxide, cerium oxide, titanium dioxide, sulfate and phosphate based inorganic compounds or a mixture thereof. It is noted that said oxides also include respective hydroxides, oxyhydroxides and respective water-containing phases.

Further, the colored pigment particle preferably comprises a final layer which comprises a silicon based organic compound. "Final layer", as defined herein, is the outmost layer of the colored pigment particle. Such compounds can be selected from siloxanes, silanes and alcohols such as the commercially available Tegomer DA 640, trimethylolpropane (TMP), octyltrichlorosilane (OCTCS), octyltriethoxysilane (OCTEO) or etidronic acid and mixtures thereof.

The coloring component is preferably selected from the group consisting of $Co_3(PO_4)_3$, $NH_4MnP_2O_7$, $Fe_4[Fe(CN)_6]_3$, $PbCrO_4$, $BaMnO_4$, $BaCrO_4$, $Fe(OH)_3$, $Fe(OH)_2$, $Cu(OH)_2$, $Ni(OH)_2$, $Co(OH)_2$, $Cr(OH)_3$, $Mn(OH)_2$, $V(OH)_5$, $Bi(OH)_3$, $Ce(OH)_3$, FeO, $Fe_2O_3$, $Cu_2O$, CuO, CoO, CrO, $Cr_2O_3$, $CrO_2$, MnO, $Mn_2O_3$, $Mn_3O_4$, VO, $V_2O_3$, $VO_2$, $V_2O_5$, $Bi_2O_3$, $Bi_2O_5$, $La_2O_3$, $La(OH)_3$, $CeO_2$, $Ce_2O_3$, $Ce_3O_4$, $Ce(OH)_3$, $Ce(OH)_4$, $Pr_6O_{11}$, $Pr(OH)_3$, $Ne_2O_3$, $Nd(OH)_3$, $Pm_2O_3$, $Pm(OH)_3$, $Sm_2O_3$, $Sm(OH)_3$, $Eu_2O_3$, $Eu(OH)_3$, $Gd_2O_3$, $Gd_2(OH)_3$, $Tb_4O_7$, $Tb(OH)_3$, $Dy_2O_3$, $Dy(OH)_3$, $Ho_2O_3$, $Ho(OH)_3$, $Er_2O_3$, $Er(OH)_3$, $Tm_2O_3$, $Tm(OH)_3$, $Yb_2O_3$, $Yb(OH)_3$, $Lu_2O_3$, and $Lu(OH)_3$ and mixtures thereof.

More preferably, the coloring component is selected from the group consisting of $Co_3(PO_4)_3$, $NH_4MnP_2O_7Fe_4[Fe(CN)_6]_3$, $PbCrO_4$, $BaMnO_4$ and $BaCrO_4$ and mixtures thereof.

In a preferred embodiment, the further layer of the colored pigment particle is also modified with a coloring component.

In yet another embodiment the at least one layer and the further layer are modified with the identical coloring component. Alternatively, the at least one layer and the further layer are modified with different coloring components.

The colored pigment particle comprises preferably about 0.5 wt. % to about 6 wt. %, more preferably about 0.75 wt. % to about 3 wt. %, and even more preferably about 1 wt. % to about 2 wt. % of the coloring component based on total weight of the colored pigment particle.

The present invention further refers to a method for obtaining a colored pigment particle comprised of the following steps:

a) providing an aqueous suspension of a titanium dioxide based pigment, b) adding a layer precursor to said suspension, c) adding a coloring component to said suspension, and d) forming a layer from the layer precursor modified with the coloring component onto the titanium dioxide based pigment to obtain the colored pigment particle.

The method steps described herein are conducted in the following order: a), b), c), and then d). However, the method can also be conducted in the following order: a), c), b), and then d). The steps b) and c) can be conducted simultaneously. The layer, as used in connection with the method according to the present invention, can be the at least one layer or the further layer. In one embodiment, the titanium dioxide based pigment provided in step a) comprises the at least one layer, and the further layer is formed in step d).

To form a silicon dioxide layer, any known silicon dioxide precursor can be used such as sodium silicate, potassium silicate, and lithium silicate. Preferably, sodium silicate is used. By known methods and techniques, the silicon dioxide layer can be formed. The addition of the precursor is preferably conducted under agitation, and at elevated temperature, if necessary. The precursor can be added to the suspension over a course of about 5 to about 60 minutes, and preferably over the course of about 30 minutes. The formed silicon dioxide layer of the invention does not only comprise silicon dioxide, but all compounds obtained by the layer such as silicon hydroxide, silicon oxide hydroxide and water containing silica phases.

To form an aluminum oxide layer, any suitable aluminum oxide precursor can be used. Preferably, sodium aluminate, aluminum sulfate, aluminum nitrate or aluminum chloride are used as precursors, and the layer can be formed by known methods and techniques such as adding a base thereby adjusting the pH to a range of 4 to 9, preferably 7. The addition of the precursor is preferably conducted under agitation, and at elevated temperature, if necessary. The precursor can be added to the suspension over a course of about 5 to about 60 minutes, and preferably over the course of about 30 minutes. The obtained aluminum oxide layer of the invention does not only comprise aluminum oxide, but all compounds obtained by the layer such as alumina hydroxide, aluminum oxide hydroxide and water containing alumina phases.

To form a zirconium dioxide layer, any suitable zirconia precursor can be used. Preferably, zirconium oxychloride, zirconium sulfate and zirconium carboxylate are used as precursors, and the layer can be formed by using methods and techniques known in the art. The addition of the precursor is preferably conducted under agitation, and at elevated temperature, if necessary. The precursor can be added to the suspension over a course of about 5 to about 60 minutes, and preferably over the course of about 30 minutes. The obtained zirconium dioxide layer of the invention does not only comprise zirconium dioxide, but all compounds obtained by the layer such as zirconium hydroxide, zirconium oxide hydroxide and water containing zirconium phases.

To form a manganese dioxide layer, any suitable manganese oxide precursor can be used. Preferably, manganese sulfates including water-free manganese sulfate, as well as mono-, tetra-, and heptahydrate, manganese nitrates including water-free and tetra-, and heptahydrates. Manganese carbonates treated with an acid can also be used as precursors, and the layer can be formed by using methods and techniques known in the art. The addition of the precursor is preferably conducted under agitation, and at elevated temperature, if necessary. The precursor can be added to the suspension over a course of about 5 to about 60 minutes, and preferably over the course of about 30 minutes. The obtained manganese dioxide layer of the invention does not only comprise manganese dioxide, but all compounds obtained by the layer such as $MnOOH$ and $Mn(II)Mn(III)_2O_4$.

If a mixture of silicon dioxide, aluminum oxide and zirconium dioxide layer is formed, the respective precursors can to be used. Further, combinations of silicon dioxide, aluminum oxide and zirconium dioxide layers can be formed, either by forming a single layer that contain a mixture of two layer materials, either a uniform mixture or with varying gradients of each layer material, or by forming sequential layers of separate layer materials. Various methods of forming each type of layer, mixed layers and multiple layer layers are well known to those of skill in the art.

The coloring component used in step c) of the method according to the invention is selected from the group consisting of $Co_3(PO_4)_3$, $NH_4MnP_2O_7$, $Fe_4[Fe(CN)_6]_3$, $PbCrO_4$, $BaMnO_4$, $BaCrO_4$, $Fe(OH)_3$, $Fe(OH)_2$, $Cu(OH)_2$, $Ni(OH)_2$, $Co(OH)_2$, $Cr(OH)_3$, $Mn(OH)_2$, $V(OH)_5$, $Bi(OH)_3$, $Ce(OH)_3$, $FeO$, $Fe_2O_3$, $Cu_2O$, $CuO$, $CoO$, $CrO$, $Cr_2O_3$, $CrO_2$, $MnO$, $Mn_2O_3$, $Mn_3O_4$, $VO$, $V_2O_3$, $VO_2$, $V_2O_5$, $Bi_2O_3$,

6

$Bi_2O_5$, $La_2O_3$, $La(OH)_3$, $CeO_2$, $Ce_2O_3$, $Ce_3O_4$, $Ce(OH)_3$, $Ce(OH)_4$, $Pr_6O_{11}$, $Pr(OH)_3$, $Ne_2O_3$, $Nd(OH)_3$, $Pm_2O_3$, $Pm(OH)_3$, $Sm_2O_3$, $Sm(OH)_3$, $Eu_2O_3$, $Eu(OH)_3$, $Gd_2O_3$, $Gd_2(OH)_3$, $Tb_4O_7$, $Tb(OH)_3$, $Dy_2O_3$, $Dy(OH)_3$, $Ho_2O_3$, $Ho(OH)_3$, $Er_2O_3$, $Er(OH)_3$, $Tm_2O_3$, $Tm(OH)_3$, $Yb_2O_3$, $Yb(OH)_3$, $Lu_2O_3$, $Lu(OH)_3$, and mixtures thereof.

The coloring component can be oxidized during the addition to the suspension or shortly during step c) or, alternatively, in step d). As oxidation agents air, oxygen, hydrogen peroxide, or other known oxidation agents can be used, at a pH of at least 2, preferably of at least 4.

Preferably, the coloring component is added in such an amount that the obtained colored pigment particle comprises about 0.5 wt. % to about 10 wt. %, preferably about 0.75 wt. % to about 6 wt. %, more preferably about 1 wt. % to about 2 wt. % of the coloring component based on total weight of the colored pigment particle.

The present invention further relates to a composition comprised of a colored pigment as claimed herein. In a preferred embodiment, this composition is a coating, lacquer, paint, plastic, paper, and ink.

Any plastic known in the prior art and suitable for the purpose according to the invention can be employed as the plastic. "Plastic", as used herein, relates to a material containing at least about 50 wt.-% of a polymer, based on the total weight of the plastic. Said polymer may be a homopolymer, a copolymer or a grafted polymer. Further, the polymer may be an atactic, isotactic or syndiotactic polymer. Further, the plastic is a thermoplast, elastomer, thermoset or thermoplastic elastomer, preferably a thermoplast. Without limitation, the polymer is selected from the group consisting of polyolefins, polystyrene, polyamide, polyketone, polyester, polyurethane, poly(meth)acrylate, and mixtures thereof. Without limitation, the polyolefin is selected from the group consisting of polyethylene, polypropylene, polybutylene, and mixtures thereof. The colored pigment particle can be incorporated in the plastic by known techniques and methods, for example, by extruding. The colored pigment particle is processed into the plastic in the usual amounts. Thus, the plastic obtained contains from about 0.1 wt.-%, to about 30 wt.-%, preferably from about 1 wt.-%, to about 25 wt.-%, of the agent according to the invention, based on the total weight of the plastic.

Finally, the present invention is directed to the use of the colored pigment particle to color a coating, lacquer, paint, plastic, paper, laminate, construction materials or ink. The construction material includes, but is not limited to, cement, mortar, stones, blocks, clinker and plastering.

EXAMPLES

Preparation of the Colored Pigment Particle

Example 1a: Manufacture a Colored Pigment Particle with $Fe_2O_3$ as Coloring Component A titanium dioxide based pigment suspension was provided by mixing titanium dioxide based pigment particles (200 g) with water (1 l). The suspension was heated to 60° C. and by adding an acid, the pH value was lowered to 2.

Then, an aqueous solution of $FeSO_4$ (20 ml, 5 wt. % referred to the weight of the water) calculated as $Fe_2O_3$ was provided by mixing $FeSO_4$ with water. This aqueous solution was added to the titanium dioxide based pigment suspension over a course of 10 minutes. Then, $H_2O_2$ was slowly added in an amount sufficient to transform $FeSO_4$ to $Fe_2O_3$ to obtain a $Fe_2O_3$ dispersion.

Then, sodium aluminate was added over a course of 30 minutes in an amount to result in a 2.4 wt. % aluminum oxide layer referred to the total weight of the colored pigment particles. Then the pH was adjusted to a value of about 7 to finalize the layer formation. The colored pigment particles were filtered, washed and dried.

Example 1b: Manufacture a Colored Pigment Particle with $Fe_2O_3$ as Coloring Component A colored pigment particle was obtained following the protocol of Example 1a, but 40 ml of the aqueous solution of $Fe_2O_3$ was used.

Example 1c: Manufacture a Colored Pigment Particle with $Fe_2O_3$ as Coloring Component A colored pigment particle was obtained following the protocol of Example 1a, but 80 ml of the aqueous solution of $Fe_2O_3$ was used.

Example 1d: Manufacture a Colored Pigment Particle with $Fe_2O_3$ as Coloring Component A colored pigment particle was obtained following the protocol of Example 1d, but 160 ml of the aqueous solution of $Fe_2O_3$ was used.

CIELAB Determination

The brightness (L*) and the tone (a*) and (b*) of Examples 1a-1d was determined as follows: An aqueous lacquer formulation with Acronal LR 9014 commercially available from BASF, Germany, as a binder was provided and stirred. Then, the colored pigment particle was added and mixed until a homogenous mixture was obtained. Said mixture was then applied onto a chart obtainable from Leneta Company, USA, using the Film Applicator 510 from Erichsen GmbH &Co. KG, Germany, to obtain a 200 μm thick film. The film was dried for 24 hours in a dust free environment. The CIELAB results were determined by using the apparatus Color-view, Lichtart C/2° from Byk Gardner, Germany.

The CIELAB results of Examples 1a-1d are shown in FIG. 1.

Results

It can be seen that the chromaticity point can be adjusted by the addition of $Fe_2O_3$. The adjustment of each value (a*, b*, L*) is connected to the amount of $Fe_2O_3$ used in the respective experiment.

Test Methods and Test Results

Particle Size Determination

The size of the titanium dioxide particles were determined by using a CPS Disc centrifuge, Model DC 20000 available from CPS Instrument, Inc. located in Florida, United States of America. The sample was prepared by obtaining a first premix by mixing 2 g of a dry pigment particles with 80 g sodium hexametaphosphate solution (0.06 mass % in water) to obtain a first premix. The sodium hexametaphosphate is commercially available from BK Giulini GmbH in Laden-burg, Germany, under the name Calgon N until the first premix was homogenized. Subsequently, 2 g of this first premix were added to a sodium hexametaphosphate solution (0.06 mass % in water), and again sufficiently homogenized by mixing to obtain a second premix. 100 μl of this second premix were used as the sample for determining the particle size. The centrifuge was operated at 3,000 rpm. The calibration standard parameters were as follows:
Particle density: 1.385 g/mL
Peak diameter: 1.27 μL
Half height peak width: 0.08 μL
The fluid parameters were as follows:
Fluid density: 1.045 g/mL
Fluid refraction index: 1.344
Fluid viscosity: 1.2 cps
The above descriptions of certain embodiments are made for the purpose of illustration only and are not intended to be limiting in any manner Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A colored pigment particle comprising:
a titanium dioxide based pigment; and
at least one layer, wherein, the at least one layer is modified with a coloring component, wherein the coloring component is selected from the group consisting of $Co_3(PO_4)_3$, $NH_4MnP_2O_7$, $Fe_4[Fe(CN)_6]_3$, $PbCrO_4$, $BaMnO_4$, $BaCrO_4$, $Fe(OH)_3$, $Fe(OH)_2$, $Cu(OH)_2$, $Ni(OH)_2$, $Co(OH)_2$, $Cr(OH)_3$, $Mn(OH)_2$, $V(OH)_5$, $Bi(OH)_3$, $Cu_2O$, $CuO$, $CoO$, $CrO$, $Cr_2O_3$, $CrO_2$, $MnO$, $Mn_2O_3$, $Mn_3O_4$, $VO$, $V_2O_3$, $VO_2$, $V_2O_5$, $Bi_2O_3$, $Bi_2O_5$, $La_2O_3$, $La(OH)_3$, $CeO_2$, $Ce_2O_3$, $Ce_3O_4$, $Ce(OH)_3$, $Ce(OH)_4$, $Pr_6O_{11}$, $Pr(OH)_3$, $Ne_2O_3$, $Nd(OH)_3$, $Pm_2O_3$, $Pm(OH)_3$, $Sm_2O_3$, $Sm(OH)_3$, $Eu_2O_3$, $Eu(OH)_3$, $Gd_2O_3$, $Gd_2(OH)_3$, $Tb_4O_7$, $Tb(OH)_3$, $Dy_2O_3$, $Dy(OH)_3$, $Ho_2O_3$, $Ho(OH)_3$, $Er_2O_3$, $Er(OH)_3$, $Tm_2O_3$, $Tm(OH)_3$, $Yb_2O_3$, $Yb(OH)_3$, $Lu_2O_3$, $Lu(OH)_3$, and mixtures thereof.

2. The colored pigment particle of claim 1 further comprising a further layer.

3. The colored pigment particle of claim 2, wherein the at least one layer is located between the titanium dioxide based pigment and the further layer.

4. The colored pigment particle of claim 2, wherein the further layer is located between the titanium dioxide based pigment and the at least one layer.

5. The colored pigment particle of claim 2, wherein the further layer is modified with a coloring pigment.

6. The colored pigment particle of claim 2, wherein the at least one layer and the further layer are independently selected from the group consisting of silicon dioxide, aluminum oxide, zirconium oxide, manganese oxide, cerium oxide, titanium dioxide, sulfate and phosphate based inorganic compounds or a mixture thereof.

7. The colored pigment particle of claim 1, further comprising a final layer comprising a silicon based organic compound.

8. The colored pigment particle of claim 1, wherein the coloring component is selected from the group consisting of $Co_3(PO_4)_3$, $NH_4MnP_2O_7$, $Fe_4[Fe(CN)_6]3$, $PbCrO_4$, $BaMnO_4$, $BaCrO_4$, $Fe(OH)_3$, $Fe(OH)_2$, $Cu(OH)_2$, $Ni(OH)_2$, $Co(OH)_2$, $Cr(OH)_3$, $Mn(OH)_2$, $V(OH)_2$, $Bi(OH)_3$, $Cu_2O$, $CuO$, $CoO$, $CrO$, $CrO_2$, $MnO$, $Mn_2O_3$, $Mn_3O_4$, $VO$, $V_2O_3$, $VO_2$, $V_2O_5$, $Bi_2O_3$, $Bi_2O_5$, $La_2O_3$, $La(OH)_3$, $CeO_2$, $Ce_2O_3$, $Ce_3O_4$, $Ce(OH)_3$, $Ce(OH)_4$, $PrOn$, $Pr(OH)_3$, $Ne_2O_3$, $Nd(OH)_3$, $Pm_2O_3$, $Pm(OH)_3$, $Sm_2O_3$, $Sm(OH)_3$, $Eu_2O_3$, $Eu(OH)_3$, $Gd_2O_3$, $Gd_2(OH)_3$, $Tb_4O_7$, $Tb(OH)_3$, $Dy_2O_3$, $Dy(OH)_3$, $HO_2O_3$, $Ho(OH)_3$, $Er_2O_3$, $Er(OH)_3$, $Tm_2O_3$, $Tm(OH)_3$, $Yb_2O_3$, $Yb(OH)_3$, $Lu_2O_3$, $Lu(OH)_3$, and mixtures thereof.

9. The colored pigment particle of claim 8, wherein the coloring component is selected from the group consisting of $Co_3(PO_4)_3$, $NH_4MnP_2O_7$, $Fe_4[Fe(CN)_6]3$, $PbCrO_4$, $BaMnO_4$ and $BaCrO_4$, and mixtures thereof.

10. The colored pigment particle according to claim 2, wherein the at least one layer and the further layer are modified with the identical coloring component.

11. The colored pigment particle of claim 1, wherein the pigment particle comprises from about 0.5 wt. % to about 10 wt. % of the coloring component based on total weight of the colored pigment particle.

12. The colored pigment particle of claim 11, wherein the pigment particle comprises from about 0.75 wt. % to about 6 wt. % of the coloring component based on total weight of the colored pigment particle.

13. The colored pigment particle of claim 12, wherein the pigment particle comprises from about 1 wt. % to about 2 wt. % of the coloring component based on total weight of the colored pigment particle.

14. A colored pigment particle comprising:
a titanium dioxide based pigment; and
at least one layer, wherein, the at least one layer is modified with a coloring component, wherein:
the at least one layer is selected from the group consisting of silicon dioxide, aluminum oxide, zirconium oxide, manganese oxide, cerium oxide, titanium dioxide, sulfate and phosphate based inorganic compounds or a mixture thereof;
the coloring component is selected from the group consisting of $Co_3(PO_4)_3$, $NH_4MnP_2O_7$, $Fe_4[Fe(CN)_6]3$, $PbCrO_4$, $BaMnO_4$, $BaCrO_4$, $Fe(OH)_3$, $Fe(OH)_2$, $Cu(OH)_2$, $Ni(OH)_2$, $Co(OH)_2$, $Cr(OH)_3$, $Mn(OH)_2$, $V(OH)_5$, $Bi(OH)_3$, $FeO$, $Fe_2O_3$, $Cu_2O$, $CuO$, $CoO$, $CrO$, $Cr_2O_3$, $CrO_2$, $MnO$, $Mn_2O_3$, $Mn_3O_4$, $VO$, $V_2O_3$, $VO_2$, $V_2O_5$, $Bi_2O_3$, $Bi_2O_5$, $La_2O_3$, $La(OH)_3$, $CeO_2$, $Ce_2O_3$, $Ce_3O_4$, $Ce(OH)_3$, $Ce(OH)_4$, $Pr_6O_{11}$, $Pr(OH)_3$, $Ne_2O_3$, $Nd(OH)_3$, $Pm_2O_3$, $Pm(OH)_3$, $Sm_2O_3$, $Sm(OH)_3$, $Eu_2O_3$, $Eu(OH)_3$, $Gd_2O_3$, $Gd_2$ $(OH)_3$, $Tb_4O_7$, $Tb(OH)_3$, $Dy_2O_3$, $Dy(OH)_3$, $HO_2O_3$, $Ho(OH)_3$, $Er_2O_3$, $Er(OH)_3$, $Tm_2O_3$, $Tm(OH)_3$, $Yb_2O_3$, $Yb(OH)_3$, $Lu_2O_3$, $Lu(OH)_3$, and mixtures thereof;
the colored pigment further comprising a final layer comprising a silicon based organic compound; and
the pigment particle comprises from about 1 wt. % to about 2 wt. % of the coloring component based on total weight of the colored pigment particle.

15. A method for obtaining a colored pigment particle comprised of the following steps:
a) providing an aqueous suspension of a titanium dioxide based pigment,
b) adding a layer precursor to said suspension, c) adding a coloring component to said suspension, and
d) forming a layer from the layer precursor modified with the coloring component onto the titanium dioxide based pigment to obtain the colored pigment particle; wherein steps (b) and (c) can be performed in any order or concurrently; and wherein the resulting colored pigment particle comprises the titanium dioxide based pigment and at least one layer that is modified with the coloring component, wherein the coloring component is selected from the group consisting of $Co_3(PO_4)_3$, $NH_4MnP_2O_7$, $Fe_4[Fe(CN)_6]_3$, $PbCrO_4$, $BaMnO_4$, $BaCrO_4$, $Fe(OH)_3$, $Fe(OH)_2$, $Cu(OH)_2$, $Ni(OH)_2$, $Co(OH)_2$, $Cr(OH)_3$, $Mn(OH)_2$, $V(OH)$ s, $Bi(OH)_3$, $Cu_2O$, $CuO$, $CoO$, $CrO$, $Cr_2O_3$, $CrO_2$, $MnO$, $Mn_2O_3$, $Mn_3O_4$, $VO$, $V_2O_3$, $VO_2$, $V_2O_5$, $Bi_2O_3$, $Bi_2O_5$, $La_2O_3$, $La(OH)_3$, $CeO_2$, $Ce_2O_3$, $Ce_3O_4$, $Ce(OH)_3$, $Ce(OH)_4$, $Pr_6O_{11}$, $Pr(OH)_3$, $Ne_2O_3$, $Nd(OH)_3$, $Pm_2O_3$, $Pm(OH)_3$, $Sm_2O_3$, $Sm(OH)_3$, $Eu_2O_3$, $Eu(OH)_3$, $Gd_2O_3$, $Gd_2$ $(OH)_3$, $Th_4O_7$, $Tb(OH)_3$, $Dy_2O_3$, $Dy(OH)_3$, $HO_2O_3$, $Ho(OH)_3$, $Er_2O_3$, $Er(OH)_3$, $Tm_2O_3$, $Tm(OH)_3$, $Yb_2O_3$, $Yb(OH)_3$, $Lu_2O_3$, $Lu(OH)_3$, and mixtures thereof.

16. The method of claim 15, wherein the coloring component is selected from the group consisting of $Co_3(PO_4)_3$, $NH_4MnP_2O_7$, $Fe_4[Fe(CN)_6]_3$, $PbCrO_4$, $BaMnO_4$, $BaCrO_4$, $Fe(OH)_3$, $Fe(OH)_2$, $Cu(OH)_2$, $Ni(OH)_2$, $Co(OH)_2$, $Cr(OH)_3$, $Mn(OH)_2$, $V(OH)$ s, $Bi(OH)_3$, $Cu_2O$, $CuO$, $CoO$, $CrO$, $CrO_2$, $MnO$, $Mn_2O_3$, $Mn_3O_4$, $VO$, $V_2O_3$, $VO_2$, $V_2O_5$, $Bi_2O_3$, $Bi_2O_5$, $La_2O_3$, $La(OH)_3$, $Ce_2O_3$, $Ce_3O_4$, $Ce(OH)_3$, $Ce(OH)_4$, $Pr_6O_{11}$, $Pr(OH)_3$, $Ne_2O_3$, $Nd(OH)_3$, $Pm_2O_3$, $Pm(OH)_3$, $Sm_2O_3$, $Sm(OH)_3$, $Eu_2O_3$, $Eu(OH)_3$, $Gd_2O_3$, $Gd_2$ $(OH)_3$, $Tb_4O_7$, $Tb(OH)_3$, $Dy_2O_3$, $Dy(OH)_3$, $HO_2O_3$, $Ho(OH)_3$, $Er_2O_3$, $Er(OH)_3$, $Tm_2O_3$, $Tm(OH)_3$, $Yb_2O_3$, $Yb(OH)_3$, $Lu_2O_3$, $Lu(OH)_3$, and mixtures thereof.

17. The method of claim 15, wherein the coloring component is added in such an amount that obtained colored pigment particle comprises from about 0.5 wt. % to about 10 wt. % of the coloring component based on total weight of the colored pigment particle.

18. The method of claim 16, wherein the coloring component is added in such an amount that obtained colored pigment particle comprises from about 0.75 wt. % to 6 wt. % of the coloring component based on total weight of the colored pigment particle.

19. The method of claim 18, wherein the coloring component is added in such an amount that obtained colored pigment particle comprises from about 1 wt. % to 2 wt. % of the coloring component based on total weight of the colored pigment particle.

20. A composition comprising a colored pigment particle according to claim 1, wherein the composition is at least one of a coating, lacquer, paint, plastic, paper, construction material, or ink, and wherein the colored pigment particle colors the composition.

* * * * *